US009910814B2

(12) United States Patent
Spry et al.

(10) Patent No.: US 9,910,814 B2
(45) Date of Patent: Mar. 6, 2018

(54) METHOD, APPARATUS AND SYSTEM FOR SINGLE-ENDED COMMUNICATION OF TRANSACTION LAYER PACKETS

(71) Applicant: Intel Corporation, Sunnyvale, CA (US)

(72) Inventors: Bryan L. Spry, Portland, OR (US); Su Wei Lim, Klang (MY); Mikal C. Hunsaker, El Dorado Hills, CA (US); Rohit R. Verma, Saratoga, CA (US); Lily P. Looi, Portland, OR (US); Ronald W. Swartz, Granite Bay, CA (US); Michael W. Leddige, Beaverton, OR (US); Vui Yong Liew, Bukit Mertajam (MY)

(73) Assignee: INTEL CORPORATION, Santa Clara, CA (US)

( * ) Notice: Subject to any disclaimer, the term of this patent is extended or adjusted under 35 U.S.C. 154(b) by 188 days.

(21) Appl. No.: 14/658,026

(22) Filed: Mar. 13, 2015

(65) Prior Publication Data

US 2015/0269109 A1 Sep. 24, 2015

(30) Foreign Application Priority Data

Mar. 19, 2014 (MY) .......................... PI 2014700662

(51) Int. Cl.
*G06F 13/40* (2006.01)
*G06F 13/42* (2006.01)
*G06F 13/12* (2006.01)

(52) U.S. Cl.
CPC ........ *G06F 13/4221* (2013.01); *G06F 13/122* (2013.01); *G06F 13/4022* (2013.01);
(Continued)

(58) Field of Classification Search
CPC ............... G06F 13/122; G06F 13/4022; G06F 13/4265; G06F 13/4221; Y02B 60/1235; Y02B 60/1228
See application file for complete search history.

(56) References Cited

U.S. PATENT DOCUMENTS 8,165,133 B2 * 4/2012 Chan .................... H04L 49/352
370/351
8,630,305 B2 1/2014 Anderson et al.
(Continued)

FOREIGN PATENT DOCUMENTS

JP 2007026196 2/2007
WO WO 2013095538 A1 * 6/2013 ............. G06F 13/14

OTHER PUBLICATIONS

PCI Express Base Specification Revision 3.0; PCI SIG; pp. 155-162; Nov. 10, 2010.*
(Continued)

*Primary Examiner* — Glenn A Auve
(74) *Attorney, Agent, or Firm* — Womble Bond Dickinson (US) LLP (57) ABSTRACT

Techniques and mechanisms for exchanging single-ended communications with a protocol stack of an integrated circuit package. In an embodiment, an integrated circuit (IC) chip includes a protocol stack comprising a transaction layer which performs operations compatible with a Peripheral Component Interconnect Express™ (PCIe™) specification. Transaction layer packets, exchanged between the transaction layer and a link layer of the protocol stack, are compatible with a PCIe™ format. In another embodiment, a physical layer of the protocol stack is to couple the IC chip to another IC chip for an exchange of the transaction layer packets via single-ended communications. A packaged device includes both of the IC chips.

17 Claims, 10 Drawing Sheets

(52) U.S. Cl.
CPC ...... *G06F 13/4265* (2013.01); *Y02B 60/1228* (2013.01); *Y02B 60/1235* (2013.01)

(56) References Cited

U.S. PATENT DOCUMENTS

| | | | |
|---|---|---|---|
| 8,736,328 B2 | 5/2014 | Kurd et al. | |
| 2005/0271072 A1* | 12/2005 | Anderson | H04L 12/6418 370/419 |
| 2012/0173879 A1* | 7/2012 | Bifano | G06F 21/606 713/182 |
| 2013/0195210 A1* | 8/2013 | Swarbrick | H04L 25/02 375/259 |
| 2013/0205053 A1 | 8/2013 | Harriman et al. | |
| 2013/0313709 A1 | 11/2013 | Hinck et al. | |
| 2013/0318266 A1 | 11/2013 | Thomas et al. | |
| 2013/0326205 A1 | 12/2013 | Kulick et al. | |
| 2014/0009195 A1 | 1/2014 | Osborne et al. | |
| 2014/0040652 A1 | 2/2014 | Kulick | |
| 2014/0089549 A1 | 3/2014 | Mellinger et al. | |
| 2014/0201405 A1 | 7/2014 | Thomas et al. | |
| 2014/0204490 A1 | 7/2014 | Mellinger et al. | |
| 2014/0207991 A1* | 7/2014 | Kaushik | G06F 13/4269 710/308 |
| 2015/0041926 A1 | 2/2015 | Predhan et al. | |
| 2015/0205339 A1* | 7/2015 | Park | G06F 1/3278 713/323 |
| 2016/0179739 A1* | 6/2016 | Kil | G05F 1/625 710/106 |

OTHER PUBLICATIONS

Office Action (+ English Translation) for Korean Application No. 2015-0023533 dated Dec. 21, 2015, 9 pages.

\* cited by examiner

METHOD, APPARATUS AND SYSTEM FOR SINGLE-ENDED COMMUNICATION OF TRANSACTION LAYER PACKETS

CLAIM OF PRIORITY

This application claims the benefit of priority of Malaysia Patent Application No. PI 2014700662, filed Mar. 19, 2014, titled "METHOD, APPARATUS AND SYSTEM FOR SINGLE-ENDED COMMUNICATION OF TRANSACTION LAYER PACKETS", which is incorporated by reference in its entirety.

BACKGROUND

1. Technical Field

Embodiments of the invention relate to integrated circuit architectures. More particularly, embodiments of the invention relate to high-bandwidth on-package protocol stacks.

2. Background Art

High bandwidth interconnections between chips using conventional protocol stacks require significant power and chip area. Thus, in applications requiring significantly reduced power consumption and/or smaller chip area, these conventional protocol stacks are not desirable.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously relate to a protocol stack—for brevity, referred to herein as On-Package Interface (OPI)—including circuitry to provides for efficient communication between different integrated circuit (IC) chips of a packaged device.

Figure 1:
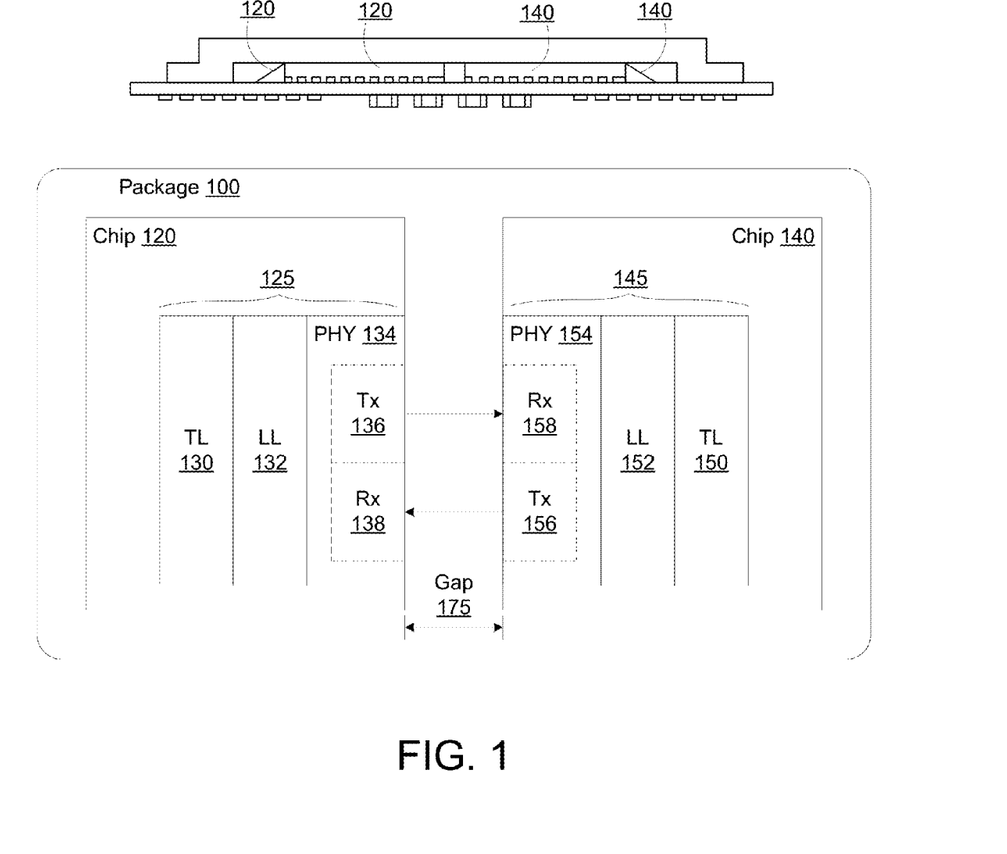
FIG. 1 is a block diagram illustrating elements of an integrated circuit package to perform single-ended communications according to an embodiment.

FIG. 1 is a block diagram of one embodiment of a multichip package (MCP) including at least two chips each comprising a respective on-package interconnect (OPI) protocol stack. The example of FIG. 1 illustrates two chips with stacks; however, any number of chips within a package can be interconnected using the techniques described herein.

Package 100 may be any type of package that may contain multiple integrated circuit chips. In the example of FIG. 1, package 100 contains chip 120 and chip 140. One or each of such chips may variously include, for example, one or more of a processor, controller, memory chip, graphics processors, etc. In one embodiment, chip 120 includes circuitry comprising a protocol stack 125 including a transaction layer TL 130, a link layer LL 132 and a physical layer PHY 134. In an embodiment, PHY 134 comprises one or more transmitters Tx 136 to send single-ended communications from chip 120 and one or more receivers Rx 138 to receive single-ended communications for chip 120. Alternatively or in addition, chip 140 may similarly include circuitry comprising a protocol stack 145 including a transaction layer TL 150, a link layer LL 152 and a physical layer PHY 154. In an embodiment, PHY 154 comprises one or more transmitters Tx 156 to send single-ended communications from chip 140 and one or more receivers Rx 158 to receive single-ended communications for chip 140. Tx 136 is coupled with Rx 158 and Rx 138 is coupled with Tx 156.

In one embodiment, gap 175 between chip 120 and chip 140 is relatively small. In one embodiment, gap 175 is less than 20 mm. In one embodiment, gap 175 is less than 10 mm. In one embodiment, gap 175 is approximately 1.5 mm. In other embodiments, gap 175 may be less than 1.5 mm. In general, the smaller gap 175, the greater the bandwidth that may be provided between chips.

Features of certain embodiments are discussed herein with reference to protocol stack 125 operating to participate in single-ended OPI communications with protocol stack 145. It is understood that such discussion may be extended to similarly apply, additionally or alternatively, to corresponding operations of protocol stack 145.

Protocol stack 125 may include relatively efficient circuitry—e.g. as compared to that for Peripheral Component Interconnect Express (PCIe™) communications—to send transactions across an on-package link. An upper layer of protocol stack 125 is TL 130. TL 130 may provide functionality to perform transaction layer processing which is according to, or otherwise compatible with, a conventional personal computer (PC)-based communication protocol—e.g. a PCIe™ communication protocol such as one in accordance with the PCI Express™ Specification Base Specification version 3.0 (published Nov. 18, 2010) or other such input/output (I/O) load-store architecture. Some examples of how certain operations of TL 130 (and/or TL 150) may be compatible with some or all transaction layer requirements of conventional (e.g. PCIe™) communication protocol are discussed herein. It is appreciated that the particular details of such conventional transaction layer requirements are understood in the art.

In an embodiment, TL 130 may variously provide for assembly and disassembly of Transaction Layer Packets (TLPs)—e.g. where TL 130 operates to assemble TLPs for transmission from protocol stack 135 and/or to disassemble TLPs received by protocol stack 125 via PHY 134. For example, TL 130 may convert received TLPs into inbound transactions for one or more processor cores (not shown) of package 120. Similar to PCIe™, TLPs may be used in various embodiments to communicate transactions, as well as certain types of events between OPI devices. TL 130 may support transmission or receipt of a TLP which has a format defined in any of a variety of PCI express (PCIe™) specifications.

Certain embodiments do not restrict the link(s) between chips 120, 140 to be used only for one transaction level protocol. By way of illustration and not limitation, TL 130 may support one or more transaction level protocols including, but not limited to, some or all of Intel® On-Chip System Fabric (IOSF) communications, native PCIe™, a video-pixel/audio-sample data format or the like. In an embodiment, TL 130 follows some or all transaction level rules, credit based flow control and/or ordering rules of a PCIe™ (or PCIe™-compatible) specification. For example, TL 130 may track flow control credits for TLPs transmitted to/from chip 140 across a link and/or may transmit transaction credit status information. Such transaction credit status information may be communicated in OPI flow control packets which, for example, are similar in one or more respects to PCIe™ flow control packets. TL 130 may throttle TLP transmissions based on flow control information provided, for example, from protocol stack 145. The OPI protocol may support a packet format which includes a packet type field that identifies whether a packet being sent across a link is a TLP or and flow control link layer packet. Although certain embodiments are not limited in this regard, protocol stack 125 may further support one or more sideband channels—e.g. to supplement other exchanges according to PCIe™, IOSF or the like. For example, TL 130 may further support a sideband protocol and variously convert sideband messages to and/or from OPI TLPs.

TL 130 may provide and/or access channel attributes information for use in identifying a quality of service (QoS). Also, TL 130 may provide hardware-controlled autonomous power management in conjunction with link layer LL 132. Alternatively or in addition, TL 130 may support implementation of one or more software managed low power link states. In some embodiments, TL 130 provides for an extension of a TPL format of PCIe™—e.g., where a TLP includes one or more extra fields to identify a packet type and/or to carry command extensions that are outside a PCIe™ TLP header format.

LL 132 may serve as an intermediate stage between TL 130 and PHY 134. To support operation with TL 130, certain functionality of LL 132 may, in one or more respects, be according to or otherwise compatible with link layer requirements of a PCIe™ specification. In an embodiment, LL 132 provides a reliable mechanism for exchanging between TL 130 and PHY 134 TLPs and/or control packets which have been or are to be communicated between protocol stacks 125, 145. LL 132 may support multiple transaction layer protocols that are to run on a single-ended OPI link.

LL 132 may include a state machine or other such control logic to perform various operations which, for example, are in support of link initialization, power management and/or the like. For example, LL 132 may comprise a link state machine (or "LSM", not shown) which controls link states and determines when one or both of chips 120, 140 may variously enter different link states. For some state transitions, the LSM may depend on a handshake between chips 120, 140. Such handshaking may be achieved using in-band message data link layer packets (DLLPs) or, for example, using sideband asynchronous signals.

LL 132 may form data link layer packets (DLLPs) to be exchanged with LL 152 and/or process DLLPs received from LL 152 via PHY 134. LL 132 may arbitrate (e.g. including multiplexing and/or demultiplexing) different TLPs, flow control packets and DLLPs which are variously received from, or to be transmitted to, chip 140. In some embodiments, link integrity is supported by LL 132—e.g. with error correction code (ECC) circuitry which performs single bit error correction, double bit error detection and/or the like.

LL 132 may differ at least in part from one or more link layer requirements of a PCIe™ (or PCIe™-compatible) specification. For example, PCIe™ specifications variously define comparatively complex link layers which support multiple functions for link integrity, replay and link training. These functions are required because the PCIe™ specification has to meet on-board routing, intra-package, inter-package and external connector constraints. Comparatively, LL 132 may operate to support a more efficient OPI protocol that exploits the short traces, lower power and/or other characteristics of an entirely on-package use case.

Operation of LL 132 may be relatively simple as compared to a PCIe™ link layer and may forego implementation of a retry mechanism, lane de-skewing, link training and/or the like. Alternatively or in addition, LL 132 may provide or otherwise support operation of a relatively simple but aggressive clock and power gating architecture. Accordingly, operation of LL 132 may exploit efficiencies which are available due to the very short gap 175 between chips 120, 140.

By way of illustration and not limitation, LL 132 may forego a use of skip ordered sets which, for example, might otherwise support parts-per-million PPM clock correction. Alternatively or in addition, LL 132 may forego some or all training of the link—e.g. including foregoing equalization training—following an exit from some low power management state. In some embodiments, LL 132 foregoes exchanging with protocol stack 145 one or more of cyclic redundancy check (CRC) information, positive acknowledgement (ACK) messages, negative acknowledgement (NAK) messages, sequence numbers or other information related to the resending of packets.

PHY 134 is the lowest layer in protocol stack 125 which serves to connect to protocol stack 145 via interconnects spanning gap 175. By way of illustration and not limitation, interconnects between PHY 134 and PHY 154 may include one or more of a strobe signal line, a valid signal line, data signal lines (e.g. eight or more) and an ECC signal line. Although certain embodiments are not limited in this regard, such interconnects may further comprise one or more sideband lines.

PHY 134 may differ significantly from physical layer requirements of a PCIe™ specification. For example, PHY 134 may include some or all of the features of conventional transmitter circuitry or receiver circuitry for on-package single-ended communication within a single chip or between different chips of a single packaged device. Such features may include, but are not limited to, those of various Intel® On-Package I/O (OPIO) circuitry which are available in various commercial products.

By way of illustration and not limitation, the interfaces between Tx 136 and Rx 158, and between Tx 156 and Rx 138 may be single-ended, relatively high-speed interfaces. In one embodiment, PHY 134 comprises CMOS circuitry for communications between chip 120 and chip 140. One or both of Tx 136 and Tx 156 may comprise impedance matched CMOS transmitters—e.g. where very weak termination (or no termination) and/or no equalization is provided. Use of a CMOS transmitter and receiver with no or weak receiver termination and no equalization can reduce I/O power. Alternatively or in addition, a forwarded clock signal may be transmitted by PHY 134 to support timing of packet exchanges. In one embodiment, length-matched routing is provided between respective transmitters and receivers of PHY 134 and PHY 154. Simplified clocking—e.g., with one forwarded clock per cluster of signals and no per pin de-skew—can be achieved due to careful length matched routing reduces clock power. Thus, the architectures described herein provide high bandwidth between chips at very low power, area and latency. In one embodiment, minimal electrostatic discharge (ESD) protection (as little as 70 Volts) is provided for the interfaces between chips 120, 140. Moreover, due to the relatively short gap 175 of the on-package interconnect, one or more functions of PHY 134 and/or PHY 154—e.g. including training, byte striping and/or scrambling—may be comparatively efficient, as compared to PCIe™.

As discussed herein, chip 120 (and/or chip 140) may, in certain embodiments, include circuitry to provide for either of two possible configurations of chip 120. One such configuration may provide for operation of protocol stack 125 as discussed herein. Another such configuration may instead provide for operation of an alternate protocol stack (not shown) in lieu of protocol stack 125. For example, in certain embodiments, chip 120 may further comprise another set of physical layer circuitry which is to operate according to a PCIe™ specification. In such an embodiment, configuration of the alternative protocol stack may include configuring LL 132 to operate with that another set of physical layer circuitry—e.g., rather than with PHY 134.

Figure 2A:
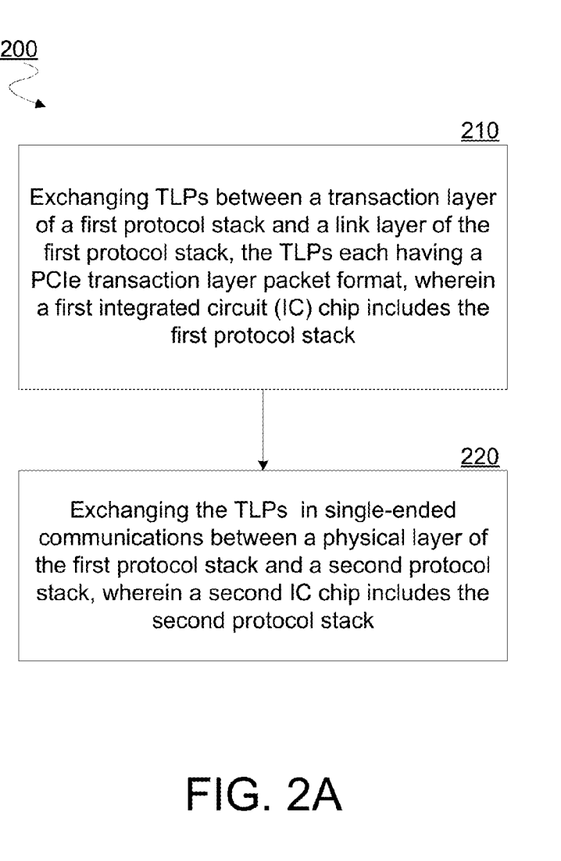
FIG. 2A is a flow diagram illustrating elements of a method for performing single-ended intra-package communications according to an embodiment.

FIG. 2A illustrates elements of a method 200 for operating an IC chip according to an embodiment. Method 200 may be performed with an IC chip having some or all of the features of chip 120 (or chip 140), for example.

In an embodiment, method 200 comprises, at 210, exchanging TLPs between a transaction layer of a first protocol stack and a link layer of the first protocol stack. The first transaction layer may perform operations according to transaction layer requirements of the PCIe™ specification. For example, the TLPs exchanged at 210 may each have a respective format which is compatible with a transaction layer packet format defined by a PCIe™ specification. In an embodiment, a first IC chip of a packaged device includes the first protocol stack.

Method 200 may further comprise, at 220, exchanging the TLPs in single-ended communications between a physical layer of the first protocol stack and a second protocol stack, wherein a second IC chip (other than the first IC chip) of the same packaged device includes the second protocol stack. Some or all communications between the first protocol stack and the second protocol stack may be performed independent of any operation(s) according to one or more PCIe™ link layer requirements. For example, in an embodiment, any communication between the first link layer and the second protocol stack is independent of the first link layer exchanging with the second protocol stack any acknowledgement message—whether positive (ACK) or negative (NACK)—which specifies whether a TLP has been successfully exchanged. Alternatively or in addition, any communications between the first protocol stack and the second protocol stack may be performed independent CRC calculations, equalization training for a link—e.g. at least during transitions from certain low power states—and/or the like.

Figure 2B:
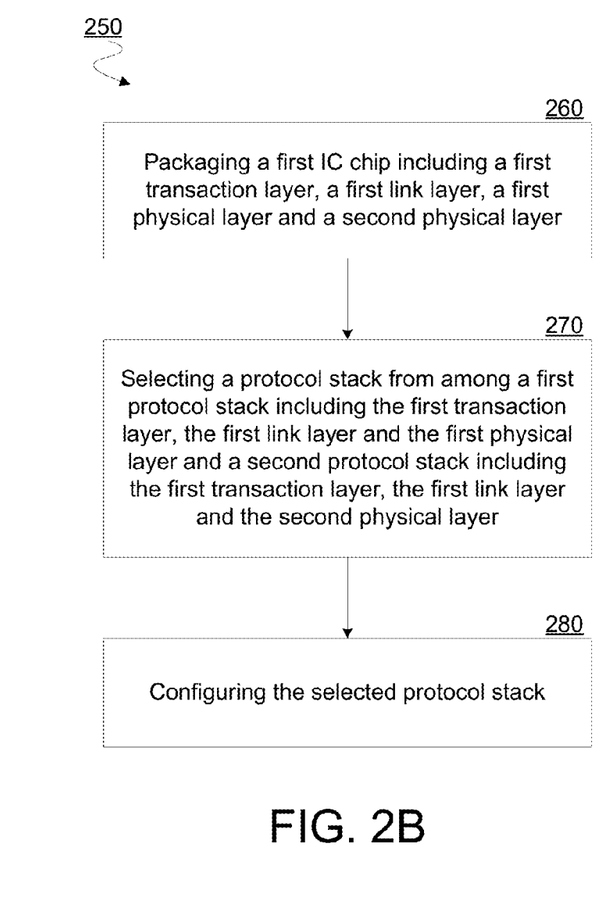
FIG. 2B is a flow diagram illustrating elements of a method for configuring an integrated circuit chip according to an embodiment.

FIG. 2B illustrates elements of a method 250 for configuring a protocol stack of an IC chip according to an embodiment. Method 250 may be performed to configure chip 120 (or chip 140) for operation in package 100. Alternatively, method 250 may be performed to instead configure chip 120 for operation in another package. For example, chip 120 may alternatively be configured according to method 250 to perform inter-package communications with another protocol stack of a different package (as opposed to intra-package communications such as that within package 100).

In an embodiment, method 250 includes, at 260, packaging a first IC chip to form a packaged device, the first IC chip including a first transaction layer, a first link layer, a first physical layer and a second physical layer. The first physical layer may include some or all of the features of PHY 134, for example. By contrast, the second physical layer may provide for operation according to a PCIe™ specification.

Method 250 may further comprise, at 270, selecting a protocol stack from among a first protocol stack (including the first transaction layer, the first link layer and the first physical layer) and a second protocol stack (including the first transaction layer, the first link layer and the second physical layer). Such selection may include providing to and/or receiving with the first IC chip one or more signal to operate configuration circuitry of the first IC chip. Such one or more signals may specify or otherwise determine the states of various fuses, switches, register values and/or other configuration circuitry of the first IC chip.

At 280, method 250 comprises configuring the protocol stack selected at 270. In an embodiment, configuring the first protocol stack at 280 enables the first physical layer to exchange TLPs in single-ended communications with another protocol stack of another IC chip. Alternatively or in addition, configuring the second protocol stack at 280 may enable the second physical layer to exchange the TLPs according to a Peripheral Component Interconnect Express™ (PCIe™) specification.

Figure 3:
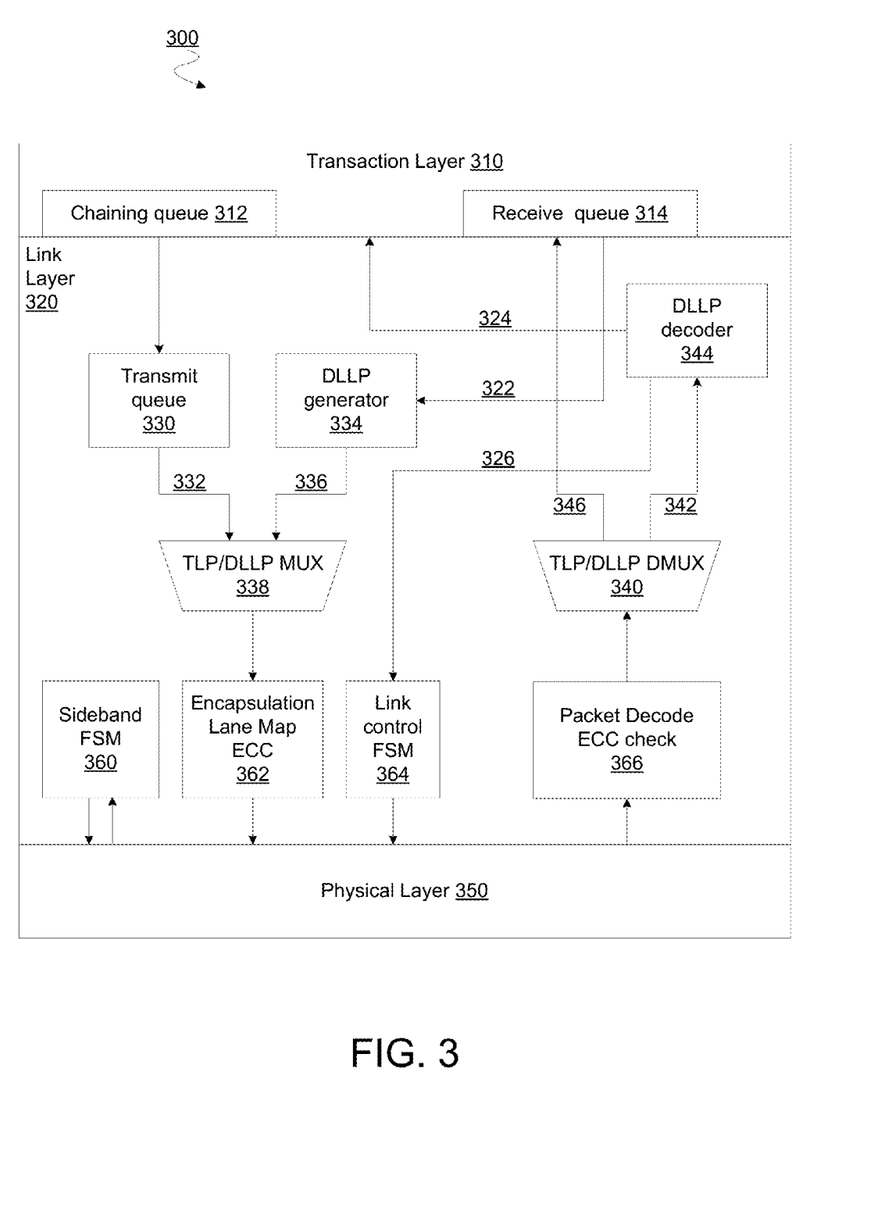
FIG. 3 is a block diagram illustrating elements of an integrated circuit chip according to an embodiment.

FIG. 3 illustrates elements of an integrated circuit chip 300 according to an embodiment. IC chip 300 may include some or all of the features of chip 120, for example. In an embodiment, operation of IC chip 300 includes performing method 200.

As shown in FIG. 3, a protocol stack of IC chip 300 comprises transaction layer 310, link layer 320 and physical layer 350 which (for example) provide the respective functionality of TL 130, LL 132 and PHY 134. Transaction layer 310 may include circuitry to exchange with link layer 320 TLPs which, for example, are variously formatted according to a TLP format of a PCIe™ specification. By way of illustration and not limitation, transaction layer 310 may include a chaining queue 312 to output TLPs to a transmit queue 330 of link layer 330. Alternatively or in addition, TLPs which the protocol stack have received via physical layer 350 may be provided to a receive queue 314 of transaction layer 310—e.g. via a demultiplexer (DMUX) 340 of link layer 320.

In operation, link layer 320 may support a protocol for physical layer 350 to exchange PCIe™ compatible TLPs via single-ended communications. For example, physical layer 350 may, over time, variously receive TLPs for processing by transaction layer 310 and DLLPs for processing by link layer 320. Circuit logic 366 of link layer 320 may perform packet decoding, ECC checking and/or other preliminary processing of some or all such TLPs and DLLPs. Subsequently, DMUX 340 may variously direct TLP information 346 and DLLP information 342 for different respective processing. For example, TLP information 346 may be sent on to receive queue 314, and DLLP information 342 may be provided to a DLLP decoder 344 of link layer 344.

Based on the TLP information 346, transaction layer 310 may determine a corresponding number of receive credits, which may be communicated in a signal 322 to a DLLP generator 334 of link layer 320. In response to signal 322, DLLP generator 334 may generate DLLP information 336—e.g. including one or more DLLP packets—for subsequent link control communications with a link layer of the opposite member protocol stack. Additionally or alternatively, DLLP decoder 344 may provide to a link control finite state machine (FSM) of link layer 320 a power state signal 326. In response to signal 326, link control 364 may signal to the other protocol stack a next power state for IC chip 300 and/or for the IC chip of that other protocol stack.

Based on the DLLP information 342, DLLP decoder 344 may further determine a corresponding number of transmit credits, which may be communicated in a signal 324 to transaction layer 310. In turn, transaction layer 310 may—e.g. according to PCIe™ techniques—determine whether and/or how subsequent TLP packets are to be transmitted. In an embodiment, link layer 320 further comprises a multiplexer (MUX) 338 to selectively provide to physical layer logic 350 TLP information 332 from transmit queue 330 and DLLP information 336 from DLLP generator 334. Such information from MUX 338 may first by provided to logic 362 of link layer 320 which is to provide packet encapsulation, lane mapping, ECC calculation and/or other processing.

In an embodiment, functionality of protocol stack of IC chip 300 exploits an opportunity, provided by an on-package interconnect use case, to forego one or more exchanges which might otherwise be required to comply with a PCIe™ specification. For example, link layer 320 may operate independent of circuit logic which is to support an exchange of acknowledgement information—e.g. including one or both of positive acknowledgement (ACK) messages and negative acknowledgement (NACK) messages of PCIe™—to communicate whether (or not) a TLP has been successfully been exchanged between protocol stacks of the packaged device. Alternatively or in addition, control logic of link layer 320, such as link control FSM 364, may forego a state and/or state transition which includes or otherwise supports one or more types of link training. For example, link layer 320 may implement a power state transition from an idle or other comparatively low power state to a higher power state, where such a transition does not include any link equalization training.

Figure 4:
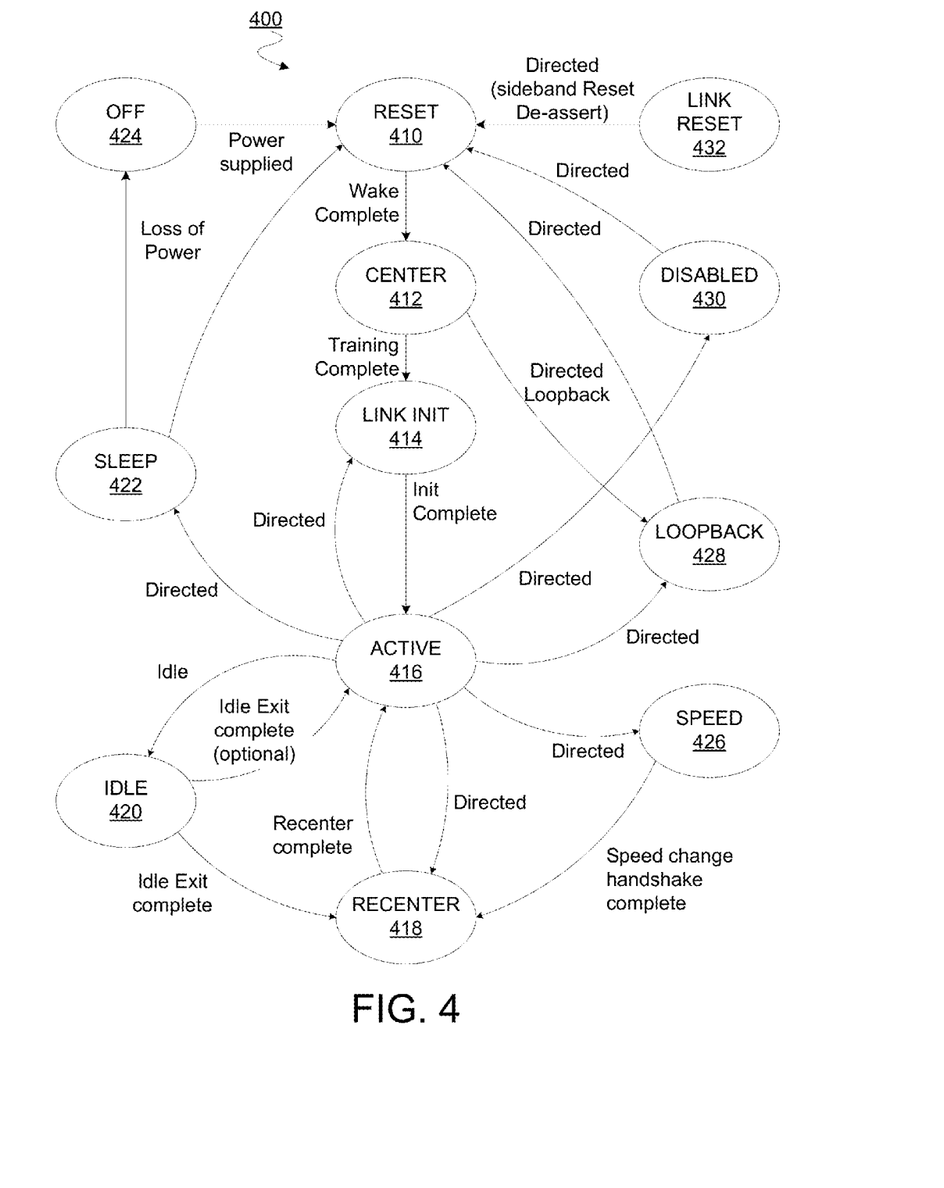
FIG. 4 is a state diagram illustrating elements of a link layer state machine according to an embodiment.

FIG. 4 illustrates elements of a state machine 400 for operation of a link layer in a protocol stack of an IC chip according to an embodiment. State machine 400 may operate to provide functionality of LL 132 (or LL 152), for example. In an embodiment, state machine 400 includes or operates with logic such as that of link control FSM 364.

State machine 400 may include a Reset 410 state which, for example, may be entered following a platform reset event. Reset 410 may also be entered from one of a Disabled 430 state when directed, a Link Reset 432 state upon conclusion thereof, a Loopback 428 state when loopback is complete, or a Sleep 422 state in response to a wake event. In some embodiments, a Link Reset 432 prior to Reset 410 may be entered from most other states of state machine 400.

Reset 410 may include performance of preliminary physical layer operations including, for example, calibration of one or more receiver circuits and/or a changing of physical layer transmitter contacts from an electrical tri-state to a transmit quiet signal state. After Reset 410 completes wake operations, a Center 412 state of state machine 400 may allow physical layer receiver circuitry to adjust a strobe delay for proper sampling of data. Center 412 may provide a break between a PHY centering sequence and link initialization to allow the link to prepare to transmit and receive initialization link layer packets.

The next state after Center 412 is Loopback 428 if, for example, operations during Center 412 indicate a directed loopback. Otherwise, state machine 400 proceeds from Center 412 to a Link Init 414 state. Link Init 414 may allow the link to complete initial link management using link layer packets. For example, a link control LLP may be exchanged between respective protocol stacks of two ICs as an indication that the link communication is healthy. This state may also be used to control the enabling or disabling of scrambling in the subsequent state, Active 416. Certain embodiments expedite link management operations between Reset 410 and Active 416—e.g. by foregoing equalization training and/or other types of link training which might otherwise be implemented according to PCIe.

Active 416 facilitates completion of a flow control initialization process in preparation for a sending of TLPs. The flow control initialization process may communicate initial credit values across the two protocol stacks. These credits may be used by the transaction layer to check target resources before sending TLPs on the link. In an embodiment, Active 416 corresponds in one or more respects to the PCIe™ link state L0. In an embodiment, changing state from Active 416 is always under the control of the upstream (transmitting) device. The downstream (receiving) device may request a change of state through an appropriate DLLP, but transitioning of Active 416 may be controlled by the upstream device.

Figure 5:
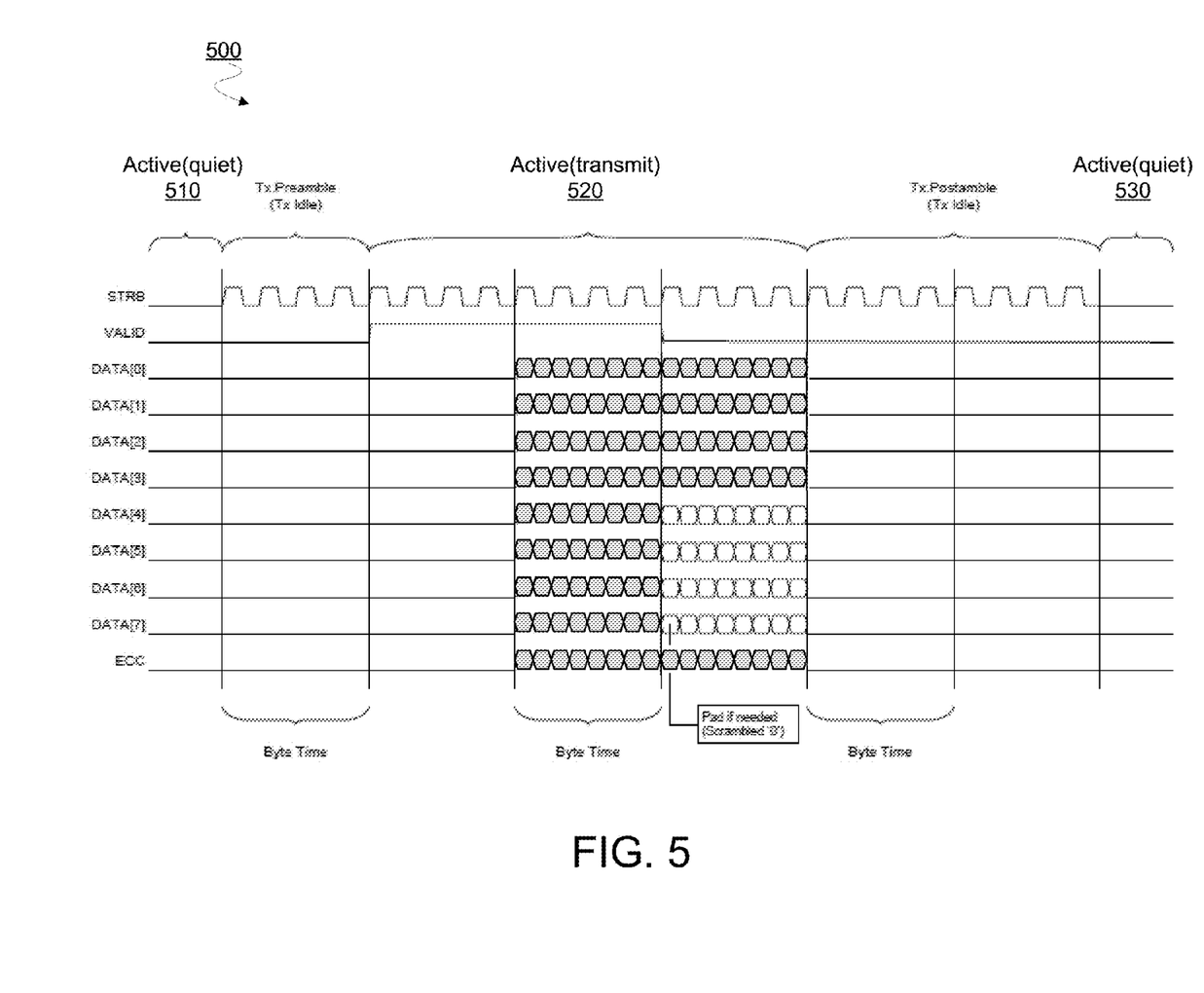
FIG. 5 is a timing diagram illustrating elements of signaling performed by a protocol stack according to an embodiment.

As illustrated in the timing diagram 500 of FIG. 5, for example, Active 416 may include a time period Active (quiet) 510 during which a strobe signal STRB is stable. Active(quiet) 510 may be followed by a preamble period which is indicated by an initial cycling of STRB. After a unit interval of the preamble period, a time period Active(transmit) 520—indicated by a signal VALID—begins for an exchange of TLP data and associated ECC information. Active(transmit) 520 is then followed by a postamble time period, and then by another Active(quiet) 530. Certain embodiments provide for a relatively short preamble period and/or postamble period for Active(transmit) 520—e.g. where such preamble/postamble periods are each less than 50 nanoseconds (as opposed to corresponding time periods for PCIe, which are typically multiple microseconds in duration).

From Active 416, a Recenter 418 state may be entered to facilitate periodic alignment of the PHY—e.g. using a strobe signal and/or a data pattern. Recenter 418 may provide for PHY receiver circuitry to adjust a strobe delay for proper sampling of data. Recenter 418 may further provide a break between the centering sequence and initialization which allows the link to prepare to transmit and receive TLPs. Recenter 418 may be entered from Active 416, an Idle 420 state or a Speed 426 state.

Idle 420 is a power savings state that allows for a strobe signal to change state between an electrical idle state and an Active(quiet) signal state. A Sleep 422 state may prepare for the removal of power and/or clock signals from the IC. After Sleep 422, an Off 242 state may include the IC being in one of an L2 or L3 power state of PCIe™—e.g. depending on whether auxiliary power is available. Speed 426, an optional state used to change link frequency, is followed by Recenter 418. Loopback 428 may be entered either from Active 416 or from Center 412—e.g. in a directed loopback mode. Loopback 428 is a debug mode that can be used to force the link to return to Center 412 when the link is not able to initialize up to or through Active 416. Disabled 430 is entered when the device is to transition to a low power state between Active 416 and Reset 416.

Certain embodiments variously provide for selective configuration of an IC chip to implement a particular one of two possible protocol stacks including, for example, an OPI stack and a PCIe™ (or PCIe-compatible) protocol stack. Transaction layer circuitry and/or link layer circuitry of such an IC may be available for inclusion in either one of the protocol stacks.

Figure 6:
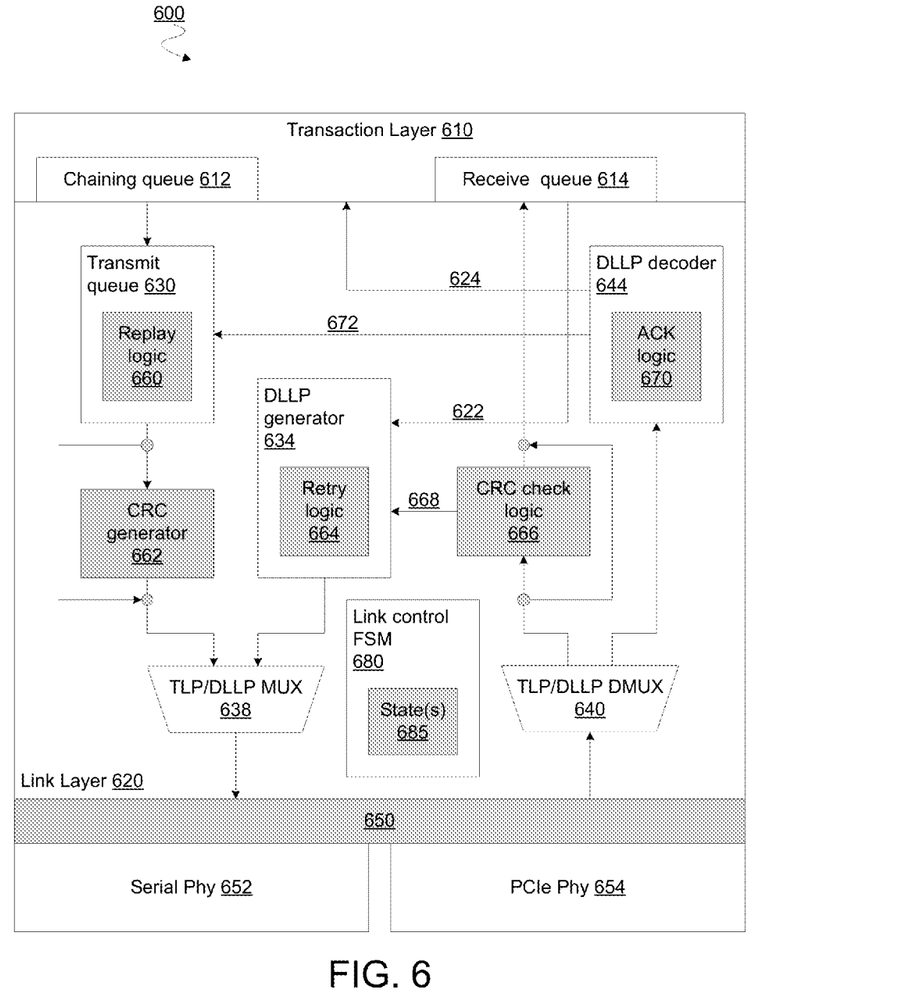
FIG. 6 is a block diagram illustrating elements of a configurable integrated circuit chip according to an embodiment.

For example, FIG. 6 illustrates elements of an integrated circuit chip 600 according to an embodiment. IC chip 600 may include some or all of the features of chip 300, for example. As shown in FIG. 6, a protocol stack of IC chip 600 comprises transaction layer 610, link layer 620 and serial Phy 652 which (for example) provide the respective functionality of transaction layer 310, link layer 320 and physical layer 350. IC chip 600 may further comprise other physical layer circuitry, as represented by the illustrative PCIe Phy 654, which is available to be selected as an alternative to single-ended Phy 652 for operation in a protocol stack with link layer 620 and transaction layer 610.

By way of illustration and not limitation, transaction layer 610 may include a chaining queue 612 and receive queue 614 corresponding functionally to chaining queue 312 and receive queue 314, respectively. Similarly, a MUX 638, DMUX 640, DLLP generator 634, DLLP decoder 644 and transmit queue 630 of link layer 620 may functionally correspond, respectively, to MUX 338, DMUX 340, DLLP generator 334, DLLP decoder 344 and transmit queue 330. For example, DLLP decoder 644 may provide to transaction layer 610 an indication 624 of transmit credits which are determined based on DLLP information from DMUX 640. Alternatively or in addition, transaction layer 310 may, based on TLP information 346 from DMUX 640, send to DLLP generator 634 an indication 622 of receive credits for use in generating subsequent DLLPs.

Configuration logic of IC 600, as variously represented by different shaded elements of FIG. 4, may allow for selection and configuration of one of at least two possible protocol stacks. In an embodiment, configuration of IC chip 600 includes performing method 250. The potentially-configurable protocol stacks may include different respective physical layer circuitry and, in an embodiment, may include transaction layer 610 and at least some circuit logic of link layer 620. For example, configuration logic 650 may include any of a variety of switches, fuses or other such circuitry which is operable to select and configure paths for data, control, power, clock and/or other signals to be variously exchanged between link layer 620 and one (i.e. only one) of single-ended Phy 652 and PCIe Phy 654.

Alternatively or in addition, components and/or signal paths of link layer 620 may be variously configured to be selectively included in, or excluded from, operation in the selected protocol stack. By way of illustration and not limitation, configuration of a first protocol stack including single-ended Phy 652 may comprise disabling, disconnecting or otherwise selecting for exclusion one or more components of link layer 620 which might otherwise support ACK/NACK message signaling. Such ACK/NACK mechanisms, which are used in PCIe™ to determine whether a TLP needs to be resent, may be excluded for more efficient operation in an on-package interconnect use case, wherein loss of a TLP is highly unlikely in communications between IC chips of the same packaged device.

In an illustrative embodiment, ACK/NACK mechanisms of link layer 620 include ACK logic 670 which is to identify that DLLP information from DMUX includes or otherwise indicate an ACK (or NACK) for a previously-transmitted TLP. If enabled for operation, ACK logic 670 may forward or otherwise indicate the ACK/NACK in a signal 672. In response to signal 672, replay logic 660 included in or coupled to transmit queue 660 may determine whether a previously-transmitted TLP needs to be retransmitted. Accordingly, in one embodiment, configuration of the first protocol stack may include disconnecting and/or disabling one or both of ACK logic 670 and replay logic 660. By contrast, configuration of the second protocol stack (including PCIe Phy 654) may include connecting or otherwise enabling operation of ACK logic 670 and/or replay logic 660.

Although certain embodiments are not limited in this regard, configuring a protocol stack for IC chip 600 may alternatively or additionally include selectively including or excluding from operation certain CRC mechanisms of link layer 620. For example, link layer 620 may comprise CRC check logic 666 to perform cyclic redundancy evaluations for TLPs received from DMUX 640. Similarly, link layer 620 may comprise a CRC generator 662 to determine cyclic redundancy values for TLPs which are to be transmitted from IC chip 600. In response to detecting a CRC error event for received TLPs, CRC check logic 666 may send a control signal 668 indicating to retry logic 664 (e.g., included in or coupled to DLLP generator 634) whether one or more TLPs need to be retransmitted to IC chip 600. Accordingly, in one embodiment, configuration of the first protocol stack may include disconnecting, switchedly bypassing, and/or disabling some or all of CRC check logic 666, retry logic 664 and CRC generator 662. By contrast, configuration of the second protocol stack (including PCIe Phy 654) may include connecting or otherwise enabling operation of CRC check logic 666, retry logic 664 and/or CRC generator 662.

Additionally or alternatively, configuration of a protocol stack may include selectively including or excluding operation of state machine logic—e.g. including one or more states 685 of a link control FSM 680—which is for controlling link layer 620. For example, the one or more states 685 may include or correspond to PCIe™ link layer operations which are not to be implemented in the context of an OPI protocol stack.

Figure 7:
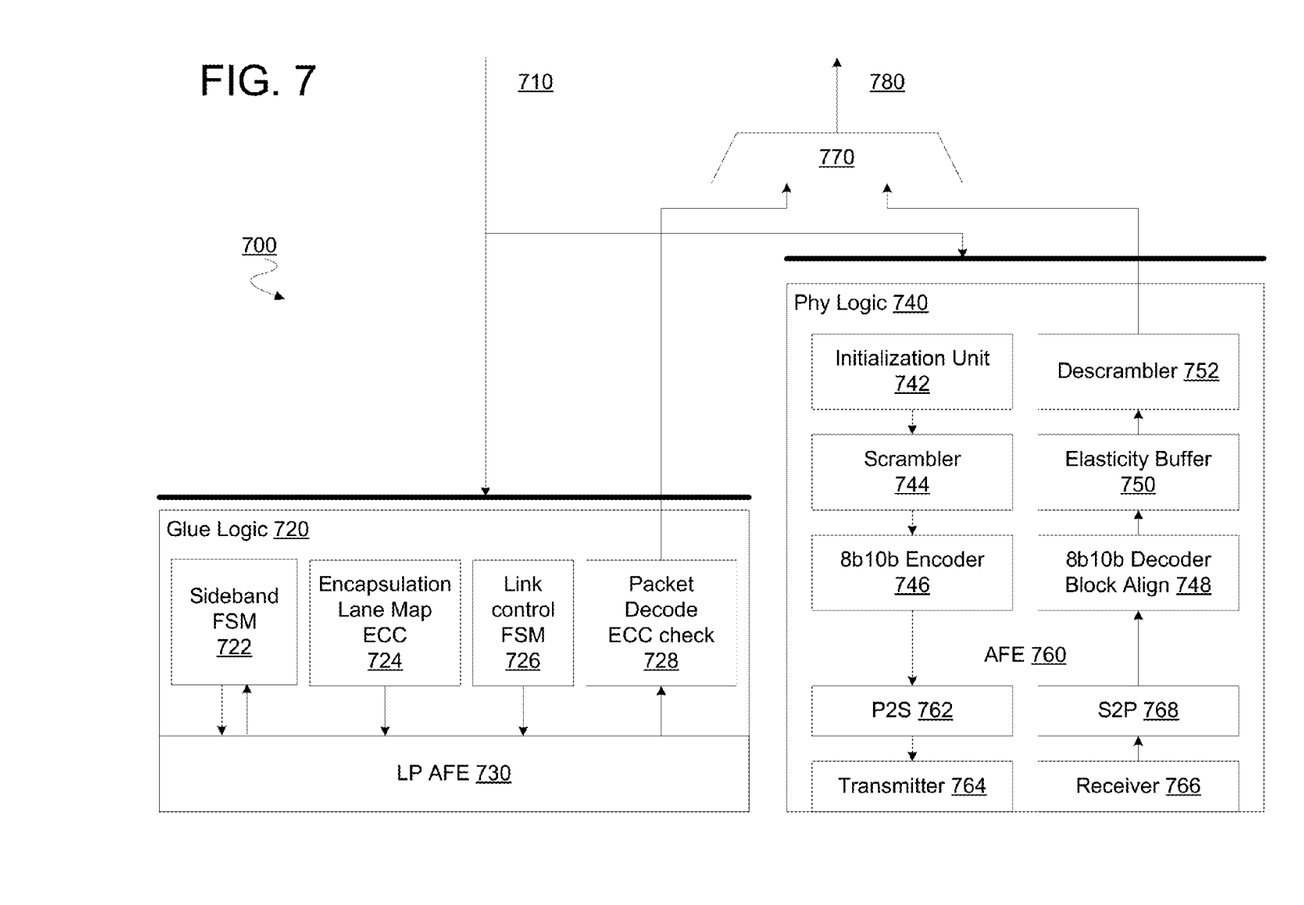
FIG. 7 is a block diagram illustrating elements of a configurable integrated circuit chip according to an embodiment.

FIG. 7 illustrated elements of an IC chip 700 which, according to an embodiment, is configurable to provide either of two protocol stacks. IC chip 700 may include some or all of the features of IC chip 600, in one embodiment. FIG. 7 shows functional elements which are to operate with link layer logic and transaction layer logic (not shown) of IC chip 700. Such link layer logic and transaction layer logic may include some or all of the functionality of link layer 620 and transaction layer 610, for example.

In an embodiment, IC chip 700 includes one or more signal lines 710 to communicate TLP information and/or DLLP information such as that provided from MUX 638 for transmission from IC chip 700. Alternatively or in addition, IC chip 700 may include one or more other signal lines 780 to communicate received TLP information and/or DLLP information such as that provided to DMUX 640.

Signal lines 780 may be output from MUX logic 770 which is coupled to a first set of circuitry—e.g., Phy 652—comprising glue logic 720 and a comparatively low power (LP) analog front end (AFE) 730. MUX logic 770 may be further coupled to a second set of circuitry—e.g., PCIe Phy 654—comprising Phy logic 740 which includes (or is coupled to) an AFE 760. In an embodiment, a level, range or other voltage characteristic for operation of LP AFE 730 may be relatively high, as compared to corresponding characteristics for operation of AFE 760.

In an embodiment, MUX logic 770 includes and/or is coupled to configuration logic (not shown) which is operable to select a particular one (e.g. only one) of the first set of circuitry and the second set of circuitry. MUX logic 770 may forward signaled from the selected set of circuitry to the one or more signal lines 780. Alternatively, the other unselected set of circuitry may be excluded from a protocol stack by being disabled—e.g. where Glue logic 720 and/or LP AFE 730 (or alternatively, Phy logic 740 and/or AFE 760) is fusedly, switchedly or otherwise disconnected from one or more supply voltage lines (not shown).

Glue logic 730 may include, for example, link layer circuitry and/or physical layer circuitry which facilitates single-ended communications via AFE 730—e.g. wherein such single-ended communications have some or all of the features of the Intel® OPIO architecture. By way of illustration and not limitation, glue logic 720 may include a sideband FSM 722 such as sideband FSM 360. Alternatively or in addition, glue logic 720 may include logic 724 to perform packet encapsulation, lane mapping, ECC calculation and/or the like for TLPS to be transmitted from IC chip 700. Glue logic 720 may further include logic 728 to perform initial packet decoding, ECC checking etc. for received TLPs. In an embodiment, a link control FSM 726 of glue logic 720 provides control mechanisms such as at least some of those provided by link control FSM 364.

Phy logic 740 may include any of a variety of circuitry configured to perform physical layer operations according to PCIe. For example, a transmit sequence of Phy logic 740 may include initialization unit 742 to implement initial PHY processing of TLPs to be transmitted by differential signal communications with transmitter 764. Phy logic 740 may further comprise a scramble 744 and an 8b10 encoder 744 to provide, respectively, scrambling and encoding processing according to a PCIe™ specification. Correspondingly, a receive sequence of Phy logic 740 may include, 8b10 decoder and block alignment logic 744, an elasticity buffer and a descrambler 752, to perform reciprocal processing of received TLPs according to a PCIe™ specification. Phy logic 760 may include parallel-to-serial conversion logic P2S 762 for single-ended serial communication via transmitter 764. Phy logic 760 may further comprising serial-to-parallel conversion logic S2P 762 for parallelize TLP information received by receiver 766 as single-ended serial communications.

Figure 8A:
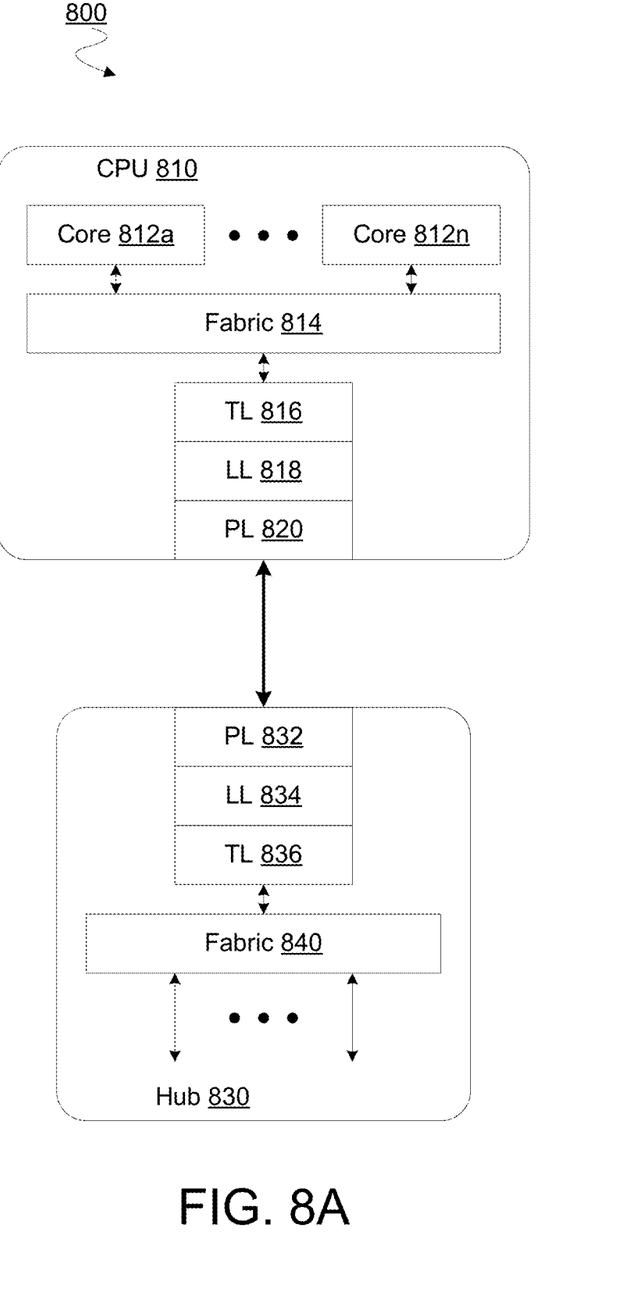
FIG. 8A is a block diagram illustrating elements of a system including an integrated circuit chip configured according to an embodiment.

FIG. 8A illustrates elements of a system 800 for exchanging communications with a packaged device including an IC chip according to an embodiment. System 800 may include one of any of a variety of hardware platforms including, but not limited to, one for a laptop computer, desktop computer, handheld device (smart phone, tablet, palmtop or the like), gaming console or other such system. In an embodiment, system 800 includes one or more IC chips which, for example, are configured according to method 250.

System 800 may comprise a first packaged device, as represented by the illustrative central processing unit (CPU) 810, which is coupled to a second packaged device represented by hub 830—e.g. a platform controller hub, I/O hub or the like. In an embodiment, a first IC chip of CPU 810 includes a first protocol stack comprising transaction layer TL 816, link layer LL 818 and physical layer PL 820. Although certain embodiments are not limited in this regard, the first IC chip may further comprise a source and/or sink for communications exchanged via the first protocol stack, as represented by the illustrative one or more processor cores 812a, . . . , 812n and a fabric 814—e.g. a bus fabric—coupling cores 812a, . . . , 812n to TL 814. Alternatively or in addition, a second IC chip of hub 830 may include a second protocol stack comprising transaction layer TL 836, link layer LL 838 and physical layer PL 832. The second IC chip may further comprise a source and/or sink for communications exchanged via the second protocol stack, as represented by the illustrative fabric 840.

In an embodiment, CPU 810 and hub 830 exchange TLPs via differential communications which, for example, are performed according to a PCIe™ specification. In such an embodiment, the first IC chip of CPU 810 may be pre-configured—e.g. during or after packaging to form CPU 810 but prior to incorporation of CPU 810 into system 800—for selection of one of at least two possible protocol stacks for the first IC chip. For example, PL 820 may include some or all of the features of Phy logic 740, where another PL of the first IC (not shown) is disabled from operating with LL 818 and TL 816. Alternatively or in addition, the second IC chip of hub 830 may be similarly pre-configured, wherein another PL of the second IC (not shown) is disabled from operating with LL 834 and TL 836.

Figure 8B:
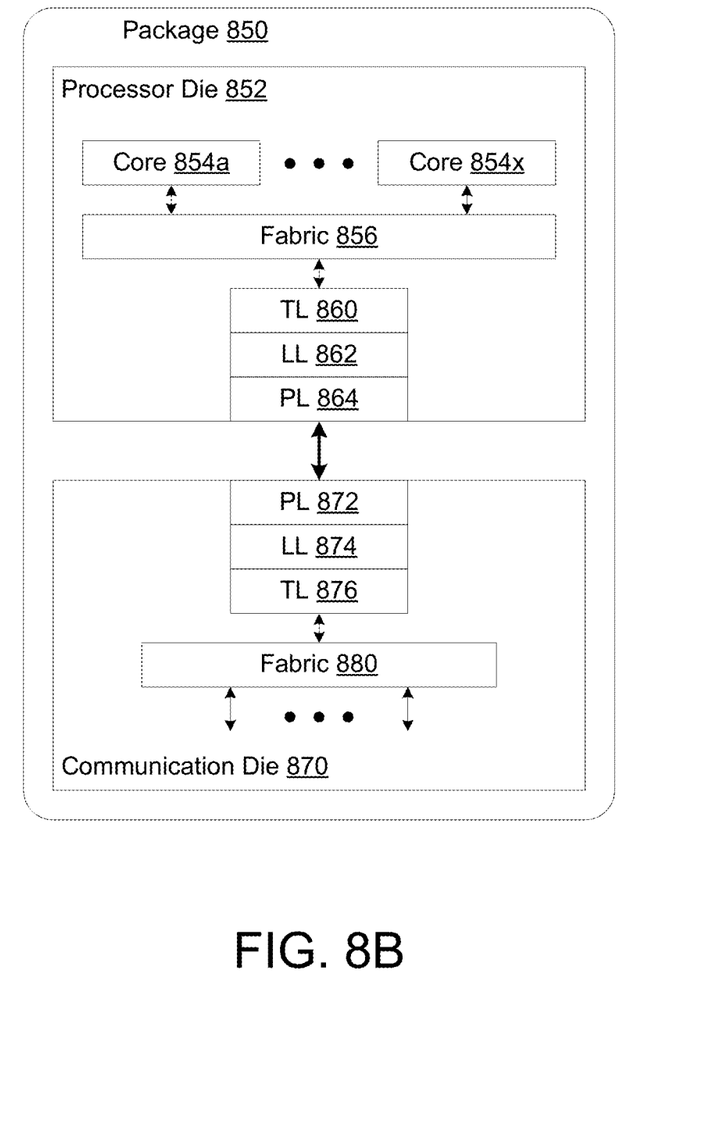
FIG. 8B is a block diagram illustrating elements of a packaged device including an integrated circuit chip configured according to an embodiment.

FIG. 8B illustrates elements of a package 850 for exchanging communications between IC chips according to an embodiment. Package 850 may include some or all of the features of package 100, for example. In an embodiment, package 850 includes one or more IC chips which, for example, are configured according to method 250.

Package 850 may comprise a first IC chip, as represented by the illustrative processor die 852, and a second IC chip—e.g. the illustrative communication die 870—coupled thereto. In an embodiment, processor die 852 includes a first protocol stack comprising transaction layer TL 860, link layer LL 862 and physical layer PL 864. Although certain embodiments are not limited in this regard, processor die 852 may further comprise a source and/or sink for communications exchanged via the first protocol stack, as represented by the illustrative one or more processor cores 854a, . . . , 854x and a fabric 856 coupling cores 854a, . . . , 854x to TL 860. Alternatively or in addition, communication die 870 may include a second protocol stack comprising transaction layer TL 836, link layer LL 838 and physical layer PL 832. The communication die 870 may further comprise a source and/or sink for communications exchanged via the second protocol stack, as represented by the illustrative fabric 840.

In an embodiment, processor die 852 and communication die 870 exchange TLPs via single-ended OPI communications having features such as those discussed herein. In such an embodiment, processor die 852 may be pre-configured—e.g. during or after packaging to form processor die 852 and/or prior to incorporation of processor die 852 into package 850—for selection of one of at least two possible protocol stacks for processor die 852. For example, PL 864 may include some or all of the features of physical layer 350, where another PL (not shown) of processor die 852—e.g. a PCIe™ PHY—is disabled from operating with LL 862 and TL 860. Alternatively or in addition, the communication die 870 may be similarly pre-configured for another PL of the second IC (not shown) to be disabled from operating with LL 874 and TL 876.

Figure 9:
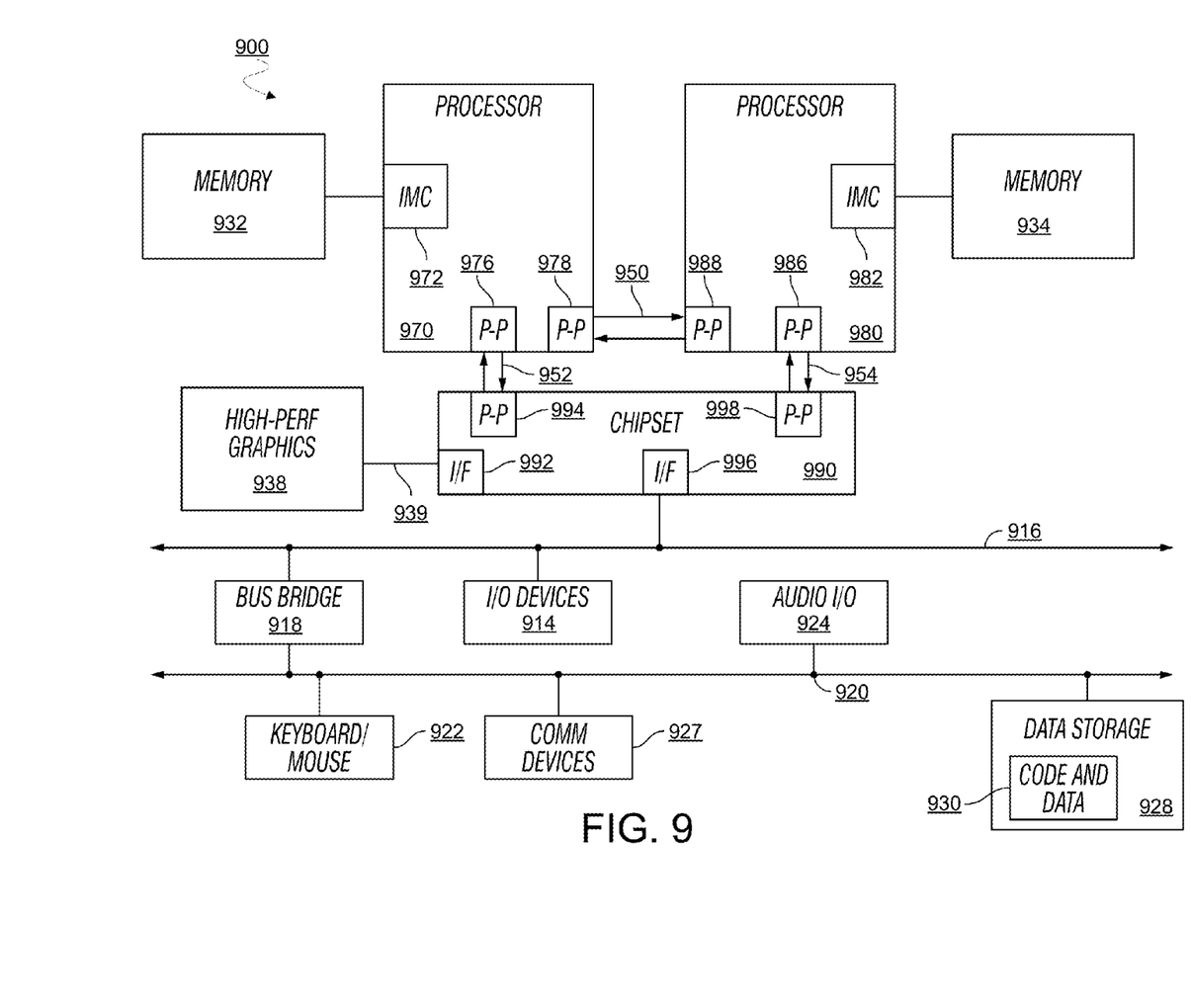
FIG. 9 is a block diagram illustrating elements of a system for exchanging communications with a protocol stack according to an embodiment.

Referring now to FIG. 9, shown is a block diagram of a system 900 in accordance with an embodiment. As shown in FIG. 9, multiprocessor system 900 is a point-to-point (P-P) interconnect system, and includes a first processor 970 and a second processor 980 coupled via a P-P interconnect 950. Each of processors 970 and 980 may be some version of a processor. While shown with two processors 970, 980, it is to be understood that the scope of the present invention is not so limited. In other embodiments, any of a variety of one or more additional or alternative processors may be present in system 900.

Processors 970 and 980 are shown including integrated memory controller units 972 and 982, respectively. Processor 970 may also include as part of its bus controller units P-P interfaces 976 and 978; similarly, second processor 980 includes P-P interfaces 986 and 988. Processors 970, 980 may exchange information via a P-P interface 950 using P-P interface circuits 978, 988. As shown in FIG. 9, IMCs 972 and 982 couple the processors to respective memories, namely a memory 932 and a memory 934, which may be portions of main memory locally attached to the respective processors. Processors 970, 980 may each exchange information with a chipset 990 via individual P-P interfaces 952, 954 using point to point interface circuits 976, 994, 986, 998. Chipset 990 may also exchange information with a high-performance graphics circuit 938 via an interface circuit 992 along a high-performance graphics interconnect 939. Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, and/or a bus bridge 918 may couple first bus 916 to a second bus 920. In one embodiment, second bus 920 includes a low pin count (LPC) bus. Any of various devices may be coupled to second bus 920 including, for example, a keyboard and/or mouse 922, communication devices 927 and a storage unit 928 such as a disk drive or other mass storage device which often includes instructions/code and data 930, in one embodiment. Further, an audio I/O 924 is shown coupled to second bus 920. Note that other architectures are possible, where the included components and interconnect architectures vary. For example, instead of the point-to-point architecture of FIG. 9, a system may implement a multi-drop bus or other such architecture.

System 900 may include a device comprising an integrated circuit and a hardware interface for that integrated circuit. By way of illustration and not limitation, such device may include processor 970, processor 980, a package (not shown) of chipset 990, memory 932, memory 934 and/or any of various other components of system 900.

Techniques and architectures for exchanging communications between integrated circuit chips are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:
1. A first integrated circuit (IC) chip comprising:
   a first protocol stack including:
      a first transaction layer to perform operations according to transaction layer requirements of an input-output

(I/O) load-store architecture which specifies differential communication of transaction layer packet information;

a first link layer to communicate with the first transaction layer transaction layer packets (TLPs) each having a respective format compatible with a transaction layer packet format defined by the I/O load-store architecture; and a first physical layer including an analog front end of the first protocol stack, the analog front end to couple the first protocol stack to a second IC chip and to participate in single-ended communications to communicate the TLPs with a second protocol stack of the second IC chip, wherein the first physical layer is coupled to the first link layer independent of any other physical layer of the first protocol stack, and further wherein any communication between the first link layer and the second protocol stack is independent of the first link layer exchanging with the second protocol stack any acknowledgement message which specifies whether a transaction layer packet has been successfully-communicated.

2. The first IC chip of claim 1, wherein any communication between the first link layer and the second protocol stack is independent of the first link layer performing any cyclic redundancy check calculation for a transaction layer packet.

3. The first IC chip of claim 1, wherein any link training to be performed by the first link layer is training other than link equalization training.

4. The first IC chip of claim 1, wherein the first link layer includes a link control state machine comprising a first state to allow the first physical layer to adjust a delay of a strobe signal to sample data.

5. The first IC chip of claim 1, wherein the I/O load-store architecture includes a transaction layer based on a Peripheral Component Interconnect Express™ (PCIe™) specification.

6. The first IC chip of claim 1, further comprising a plurality of processor cores and a bus fabric coupling the plurality of cores to the first transaction layer.

7. A method at a packaged device, the method comprising:
communicating transaction layer packets (TLPs) between
a first transaction layer of a first protocol stack and a first link layer of the first protocol stack, the TLPs each having a respective format compatible with a transaction layer packet format defined by an input-output (I/O) load-store architecture which specifies differential communication of transaction layer packet information, wherein the first transaction layer performs operations according to transaction layer requirements of the I/O load-store architecture, wherein a first integrated circuit (IC) chip of the package includes the first protocol stack, wherein a first physical layer of the first protocol stack is coupled to the first link layer independent of any other physical layer of the first protocol stack, the first physical layer including an analog front end of the first protocol stack; and communicating the TLPs in single-ended communications between the analog front end and a second protocol stack, wherein a second IC chip of the packaged device includes the second protocol stack, wherein any communication between the first link layer and the second protocol stack is independent of the first link layer communicating with the second protocol stack any acknowledgement message which specifies whether a transaction layer packet has been successfully communicated.

8. The method of claim 7, wherein any communication between the first link layer and the second protocol stack is independent of the first link layer performing any cyclic redundancy check calculation for a transaction layer packet.

9. The method of claim 7, wherein any link training performed by the first link layer is training other than link equalization training.

10. The method of claim 7, wherein the first link layer includes a link control state machine comprising a first state to allow the first physical layer to adjust a delay of a strobe signal to sample data.

11. The method of claim 7, wherein the I/O load-store architecture includes a transaction layer based on a Peripheral Component Interconnect Express™ (PCIe™) specification.

12. The method of claim 7, further comprising a plurality of processor cores and a bus fabric coupling the plurality of cores to the first transaction layer.

13. A packaged device comprising:
a first integrated circuit (IC) chip including a first protocol stack;
a second IC chip coupled to the first IC chip, the second IC chip including:
a second protocol stack comprising:
a first transaction layer to perform operations according to transaction layer requirements of an input-output (I/O) load-store architecture which specifies differential communication of transaction layer packet information;

a first link layer to communicate with the first transaction layer transaction layer packets (TLPs) each having a respective format compatible with a transaction layer packet format defined by the I/O load-store architecture; and a first physical layer including an analog front end of the second protocol stack, the analog front end coupled to participate in single-ended communications to communicate the TLPs with the first protocol stack, wherein the first physical layer is coupled to the first link layer independent of any other physical layer of the second protocol stack, and further wherein any communication between the first link layer and the first protocol stack is independent of the first link layer communicating any acknowledgement message which specifies whether a transaction layer packet has been successfully communicated.

14. The packaged device of claim 13, wherein any communication between the first link layer and the first protocol stack is independent of the first link layer performing any cyclic redundancy check calculation for a transaction layer packet.

15. The packaged device of claim 13, wherein any link training to be performed by the first link layer is training other than link equalization training.

16. The packaged device of claim 13, wherein the first link layer includes a link control state machine comprising a first state to allow the first physical layer to adjust a delay of a strobe signal to sample data.

17. The packaged device of claim 13, wherein the I/O load-store architecture includes a transaction layer based on a Peripheral Component Interconnect Express™ (PCIe™) specification.

* * * * *